No. 617,037. Patented Jan. 3, 1899.
W. H. S. MOORHOUSE & D. L. TURNER.
BICYCLE BRAKE.
(Application filed Sept. 30, 1897.)

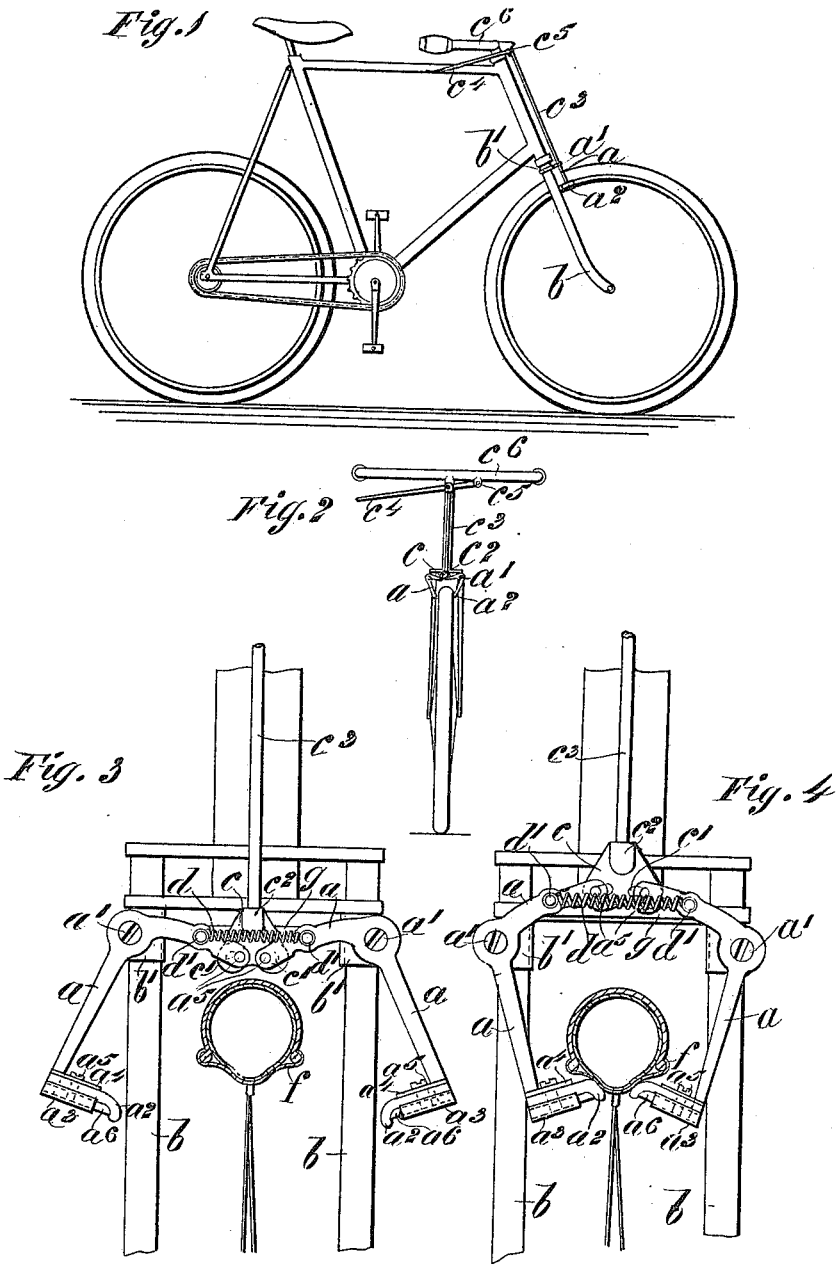

(No Model.) 2 Sheets—Sheet 2.

Witnesses:
E. B. Bolton

Inventors:
William Harold Sefton Moorhouse
Donald Langley Turner
By Richard
their Attorneys

United States Patent Office.

WILLIAM HAROLD SEFTON MOORHOUSE AND DONALD LANGLEY TURNER, OF WELLINGTON, NEW ZEALAND.

BICYCLE-BRAKE.

SPECIFICATION forming part of Letters Patent No. 617,037, dated January 3, 1899.

Application filed September 30, 1897. Serial No. 653,624. (No model.)

*To all whom it may concern:*

Be it known that we, WILLIAM HAROLD SEFTON MOORHOUSE, a subject of the Queen of Great Britain, and DONALD LANGLEY TURNER, a citizen of the United States of America, residents of Wellington, in the Colony of New Zealand, have invented an Improved Brake, of which the following is a specification.

This invention relates to brakes used upon vehicles to check the progress or stop the same; and the object of the invention is to provide a brake which may be used in connection with wheels having pneumatic, rubber, or other resilient tires and in such a manner that the wear and tear caused by the brake shall occur upon the rim or felly of the wheel with a resultant avoidance of such wear upon the tires.

It is well known to riders of vehicles, such as bicycles, that the use of the brakes ordinarily employed has a deleterious effect upon pneumatic tires, and we are aware that brakes have been devised to overcome this objection, and we refer more particularly to band-brakes or brakes operating upon the ground; but such devices are cumbersome and heavy or for other reasons have not met with favor. By the present invention a brake for a bicycle is provided which is sightly in appearance, light in weight, thoroughly effective, and is operated by the ordinary brake-lever.

In carrying out the invention upon a bicycle two bell-crank levers are pivotally attached to the front fork of the machine, the lower members of the lever being provided with pads or brake-blocks, preferably of leather, which take upon the rim or felly of the wheel. The upper members are connected by a link having slotted holes and a rod which passes upward and is connected to a brake-lever of ordinary construction. In normal circumstances the pads are held at a distance from the rim by a spiral spring fixed to the upper members of the bell-crank levers, and this spring may be assisted, if desired, by the usual spring upon the brake-lever.

A plate is provided at the back of the device to regulate the distance apart at which the pads shall be normally held, and in case of an accident with one of the pads the other shall continue to be serviceable for braking the machine without coming into contact with the spokes of the wheel.

In order that our invention may be most easily understood, reference will be made to the accompanying drawings, while giving a description in detail.

Figure 5:
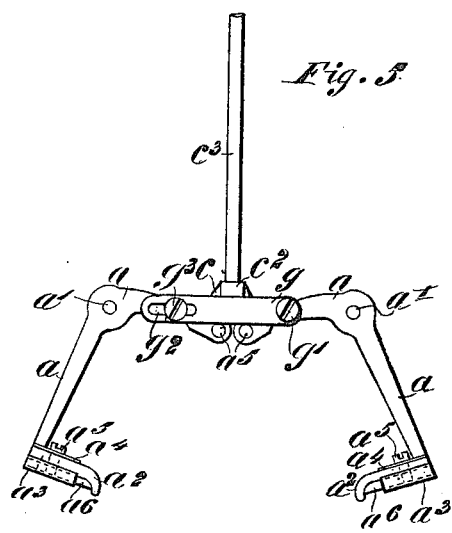
Figure 6:
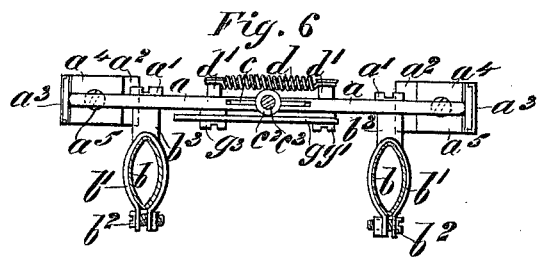

Figure 1 is a side view of a bicycle fitted with the brake. Fig. 2 is a front view of the same. Fig. 3 is a front view, on a larger scale, of the brake in its normal position. Fig. 4 is a similar view with the brake in contact with the rim. Fig. 5 is a back view of the brake. Fig. 6 is a plan of the same.

Similar letters refer to corresponding parts throughout the several views.

Referring to the drawings, the bell-crank levers $a$ are pivoted at $a'$ to the clips $b'$, by which they are attached to the front fork $b$ by means of screws $b^2$, Fig. 6. The clips are made, preferably, of steel, are sprung into position upon the fork, and have a boss $b^3$ to receive the pivot $a'$. Pads or brake-blocks $a^2$, made, preferably, of leather, are fixed to the lower members of the bell-crank levers $a$, and we prefer to fix the pads by means of grooved shoes $a^3$, made solid with the lower members, and by plates $a^4$, secured to the said shoes by screws $a^5$. The leather pad is reinforced by a block $a^6$ of wood.

The upper members of the lever $a$ are connected by link $c$, which has slotted holes $c'$, wherein pins $a^5$ may slide, and provide for the circular movement of the same. The link $c$ is made with a boss $c^2$ to take the rod $c^3$, which is pivoted at its upper end to a brake-lever $c^4$, fulcrumed at $c^5$ to the handle-bar $c^6$.

The spiral spring $d$ is in tension and normally keeps the pads $a^2$ removed from the rim $f$ of the wheel, the ends of the spring being attached to the upper members of the lever $a$ by means of its pins $d'$.

Referring now more particularly to Figs. 5 and 6, the plate $g$ is pivoted at $g'$ upon the upper member of one of the bell-crank levers $a$ and is slotted at $g^2$, so that it may slide upon the stud $g^3$ within the limit of the slot.

In case of an accident to one of the bell-crank levers $a$—such as, for example, the falling out and loss of the pad or fracture of the arm below pivot $a'$ of the lever shown on the left of Figs. 3 and 4—then all the strain would be placed upon the right-hand lever when the brake was applied. In such a case the portion of the right-hand pad which protrudes beyond the shoes $a^3$ would be liable to be forced into contact with the spokes unless means were provided to prevent it. The plate $g$ is supplied to obviate this. When the rod $c^3$ is raised to apply the brake, the pads $a^2$ approach and come into contact with the rim of the wheel, and the slot $g^2$ is made sufficiently long to allow them to bear hard upon the rim, but prevents them advancing farther by transferring the strain set up upon the pads by the rod $c^3$ to the link $g$ and the screws $g'$ and $g^3$. In other words, the link limits the range of the pads, so that they may be brought into hard contact with the rim of the wheel, but be advanced no farther and cause damage.

The brake is operated by the lever $a^4$ in the ordinary manner, as will be obvious from an inspection of the drawings.

Having now particularly described and ascertained the nature of our said invention and in what manner the same is to be performed, we declare that what we claim is—

1. A brake for vehicles having pneumatic rubber or resilient tires, consisting of two levers carrying pads or brake-blocks to form contact with the rim of the wheel said levers being operated by a link having slotted holes and a rod coupled to an ordinary brake-lever and a safety plate or link loosely connecting the levers and serving in case of accident to prevent the pads reaching the spokes of the wheel and providing that one pad may remain operative when the other is out of order, substantially as and for the purposes set forth herein.

2. In combination with the wheel of a bicycle having a pneumatic rubber or other resilient tire, a brake consisting of the levers $a$ having pads $a^2$ link $c$ rod $c^3$ brake-lever $c^4$ spiral spring $d$ and plate $g$ substantially as and for the purposes set forth herein.

In witness whereof we have hereunto subscribed our names this 31st day of August, 1897.

WILLIAM HAROLD SEFTON MOORHOUSE.
DONALD LANGLEY TURNER.

Witnesses:
  E. F. HADFIELD,
  A. W. W. CURTIS.